(12) United States Patent
Nakayama et al.

(10) Patent No.: US 7,566,829 B2
(45) Date of Patent: Jul. 28, 2009

(54) ELECTRICAL JUNCTION BOX

(75) Inventors: Makoto Nakayama, Shizuoka-ken (JP);
Katsuya Hashimoto, Shizuoka-ken (JP);
Hirofumi Mizuno, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/846,742

(22) Filed: Aug. 29, 2007

(65) Prior Publication Data

US 2008/0053699 A1 Mar. 6, 2008

(30) Foreign Application Priority Data

Aug. 31, 2006 (JP) ............................ P2006-236426

(51) Int. Cl.
*H02G 3/14* (2006.01)
(52) U.S. Cl. .................. 174/50; 174/50.54; 174/54; 174/58; 174/64; 220/4.02; 439/535; 249/906
(58) Field of Classification Search ................ 174/50, 174/50.54, 58, 64, 59, 60; 220/4.02, 3.8, 220/3.9; 439/535, 76.1, 76.2; 248/906
See application file for complete search history.

(56) References Cited

U.S. PATENT DOCUMENTS

| | | | | | |
|---|---|---|---|---|---|
| 5,864,091 | A | * | 1/1999 | Sumida ........................ | 174/50 |
| 6,121,548 | A | * | 9/2000 | Matsuoka ..................... | 174/59 |
| 6,462,276 | B2 | * | 10/2002 | Shimizu et al. ............. | 174/659 |

* cited by examiner

*Primary Examiner*—Dhiru R Patel
(74) *Attorney, Agent, or Firm*—Finnegan, Henderson, Farabow, Garrett & Dunner, L.L.P.

(57) ABSTRACT

In an electrical junction box, an electrical junction box main body is housed in a housing case consisting of an under case member and an upper case member, and a wire harness having its one end connected to the electrical junction box main body is led out to the outside of the housing case. The under case member has a pair of holding arms provided therein, which temporarily hold the wire harness to be led out roughly in a desired lead-out direction, the wire harness being led out from the under case member, in a state where the electrical junction box main body is temporarily housed in the under case member. The upper case member has guide ribs provided therein, which guide the wire harness in the desired lead-out direction, the wire harness being led out roughly in the desired lead-out direction by the pair of holding arms in the under case member, in an assembled state of the under case member and the upper case member.

6 Claims, 9 Drawing Sheets

ELECTRICAL JUNCTION BOX

BACKGROUND OF THE INVENTION

1. Field of the Invention

The present invention relates to an electrical junction box having an electrical junction box main body housed in a housing case, and more particularly relates to a wire harness lead-out structure for leading out a wire harness to outside of the housing case.

2. Description of the Related Art

As related electrical junction boxes, there are ones disclosed in Japanese Patent Application Laid-Open Publication No. 2001-112148 and in Japanese Patent Application Laid-Open Publication No. 2000-166058. As shown in FIG. 1, an electrical junction box 100 disclosed in Japanese Patent Application Laid-Open Publication No. 2001-112148 includes an electrical junction box main body 101 and a housing case 102 which consists of an under case member 103 and an upper case member 104 for housing the electrical junction box main body 101 therein. A wire harness WH having its one end connected to the electrical junction box main body 101 is fixed by a clip 105 at a predetermined position in the under case member 103. The wire harness WH fixed by the clip 105 has its leading end led out to the outside through a harness lead-out hole 103a in the under case member 103.

For assembly of the electrical junction box 100, first, the wire harness WH is inserted into the harness lead-out hole 103a in the under case member 103 and a portion of the wire harness WH disposed inside of the under case member 103 is fixed by the clip 105. Next, the electrical junction box main body 101 is temporarily housed in the under case member 103. Thereafter, the under case member 103 and the upper case member 104 are assembled to complete the assembly of the electrical junction box 100.

As shown in FIG. 2, an electrical junction box 110 disclosed in Japanese Patent Application Laid-Open Publication No. 2000-166058 includes an electrical junction box main body 111 and a housing case 113 which consists of an under case member 112 and an upper case member (not shown) for housing the electrical junction box main body 111 therein. The under case member 112 has harness lead-out cut-out parts 112a provided therein, and a wire harness (not shown) having its one end connected to the electrical junction box main body 111 is led out from the harness lead-out cut-out parts 112a. In the harness lead-out cut-out parts 112a, shielding plates 114 are slidably provided to enable shielding above the wire harness in the harness lead-out cut-out parts 112a.

For assembly of the electrical junction box 110, first, the electrical junction box main body 111 is temporarily housed in the under case member 112 while inserting the wire harness (not shown) into the harness lead-out cut-out parts 112a. Next, the shielding plates 114 are slidingly inserted into the harness lead-out cut-out parts 112a. Thereafter, the under case member 112 and the upper case member (not shown) are assembled to complete the assembly of the electrical junction box 110.

However, in the electrical junction box 100 disclosed in Japanese Patent Laid-Open No. 2001-112148, it is necessary to insert the wire harness WH into the harness lead-out hole 103a in the under case member 103 and also to fix the wire harness WH to the under case member 103 by the clip 105. Thus, a harness lead-out operation becomes complicated. As a result, there is a problem of poor assemblability of the electrical junction box 100.

Moreover, in the electrical junction box 100 disclosed in Japanese Patent Application Laid-Open Publication No. 2001-112148, the wire harness WH led out from the housing case 102 is not led out in a desired lead-out direction. If the wire harness WH led out from the housing case 102 is led out in the desired lead-out direction, routing of the wire harness WH can be efficiently performed.

In the electrical junction box 110 disclosed in Japanese Patent Application Laid-Open Publication No. 2000-166058, after the electrical junction box main body 111 is temporarily housed in the under case member 112 while inserting the wire harness (not shown) into the harness lead-out cut-out parts 112a in the under case member 112 from above, the shielding plates 114 are required to be slidingly inserted into the harness lead-out cut-out parts 112a. Thus, as in the case of the electrical junction box 100 disclosed in Japanese Patent Application Laid-Open Publication No. 2001-112148, a harness lead-out operation becomes complicated. As a result, there is a problem of poor assemblability of the electrical junction box 110.

Moreover, in the electrical junction box 110 disclosed in Japanese Patent Application Laid-Open Publication No. 2000-166058, accessories such as the shielding plates 114 are required besides the housing case 113. Thus, the number of components is increased.

SUMMARY OF THE INVENTION

The present invention was made to solve the foregoing problems of the related art. It is an object of the present invention to provide an electrical junction box which has good assemblability of the electrical junction box and also enables a wire harness to be led out in a desired lead-out direction without using accessories.

An aspect of the present invention is an electrical junction box comprising: a housing case including an under case member and an upper case member; and an electrical junction box main body housed in the housing case; wherein a wire harness having one end connected to the electrical junction box main body is led out to outside of the housing case, and any one of the under and upper case members has a harness temporary holding part which temporarily holds the wire harness to be led out roughly in a desired lead-out direction in a state where the electrical junction box main body is temporarily housed in the one of the under and upper case members, the wire harness being led out from the one of the under and upper case members.

According to the aspect of the present invention, for example, after the electrical junction box main body is temporarily housed in the under case member, the wire harness is temporarily held by the harness temporary holding part in the under case member. Thereafter, the under case member and the upper case member are assembled to complete assembly of the electrical junction box. Accordingly, as a harness lead-out operation, the wire harness may be simply held by the harness temporary holding part. Moreover, the wire harness is led out in the rough lead-out direction relative to the desired lead-out direction. Thus, good assemblability of the electrical junction box is achieved and also the wire harness can be led out approximately in the desired lead-out direction without using accessories.

Here, the other one of the under and upper case members may have a harness lead-out direction guiding part which guides the wire harness in the desired lead-out direction in an assembled state of the under and upper case members, the wire harness being led out roughly in the desired lead-out direction by the harness temporary holding part in the one of the under and upper case members.

According to the configuration described above, in addition to the above effects, the wire harness can be surely led out in the desired lead-out direction.

Here, the harness temporary holding part may include a pair of holding arms having drop preventing claws which are bent inward, and the harness temporary holding part may temporarily hold the wire harness by setting the wire harness in between the pair of holding arms with elastic deformation of the pair of holding arms.

According to the configuration described above, in addition to the above effects, the wire harness can be held only by being inserted between the pair of holding arms while bending the drop preventing claws.

Here, the second case member may have a harness cover part which covers the pair of holding arms in the assembled state of the under and upper case members.

According to the configuration described above, in addition to the above effects, elastic deformation of the pair of holding arms is inhibited by the harness cover part. Thus, it is possible to prevent a situation where the wire harness drops from the pair of holding arms. Moreover, it is possible to restrict the lead-out direction of the wire harness while protecting the wire harness so as not to allow external force to act thereon due to contact between the portion of the wire harness led out from the housing case and other parts.

Here, the harness lead-out direction guiding part may be guide ribs provided upright on an inner surface of the harness cover part.

According to the configuration described above, in addition to the above effects, the harness lead-out direction guiding part can be easily formed.

DESCRIPTION OF THE PREFERRED EMBODIMENT

Figure 1:
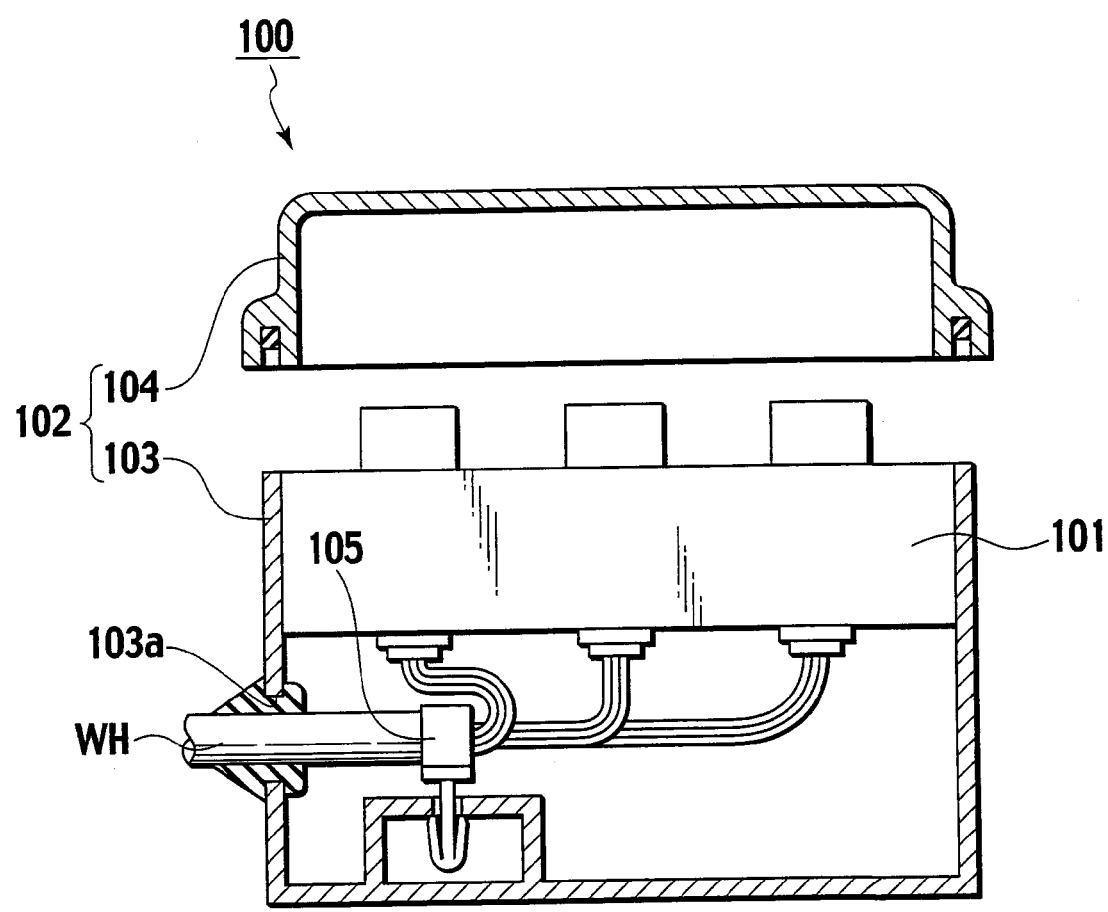
FIG. 1 is a cross-sectional view of a related electrical junction box.
Figure 2:
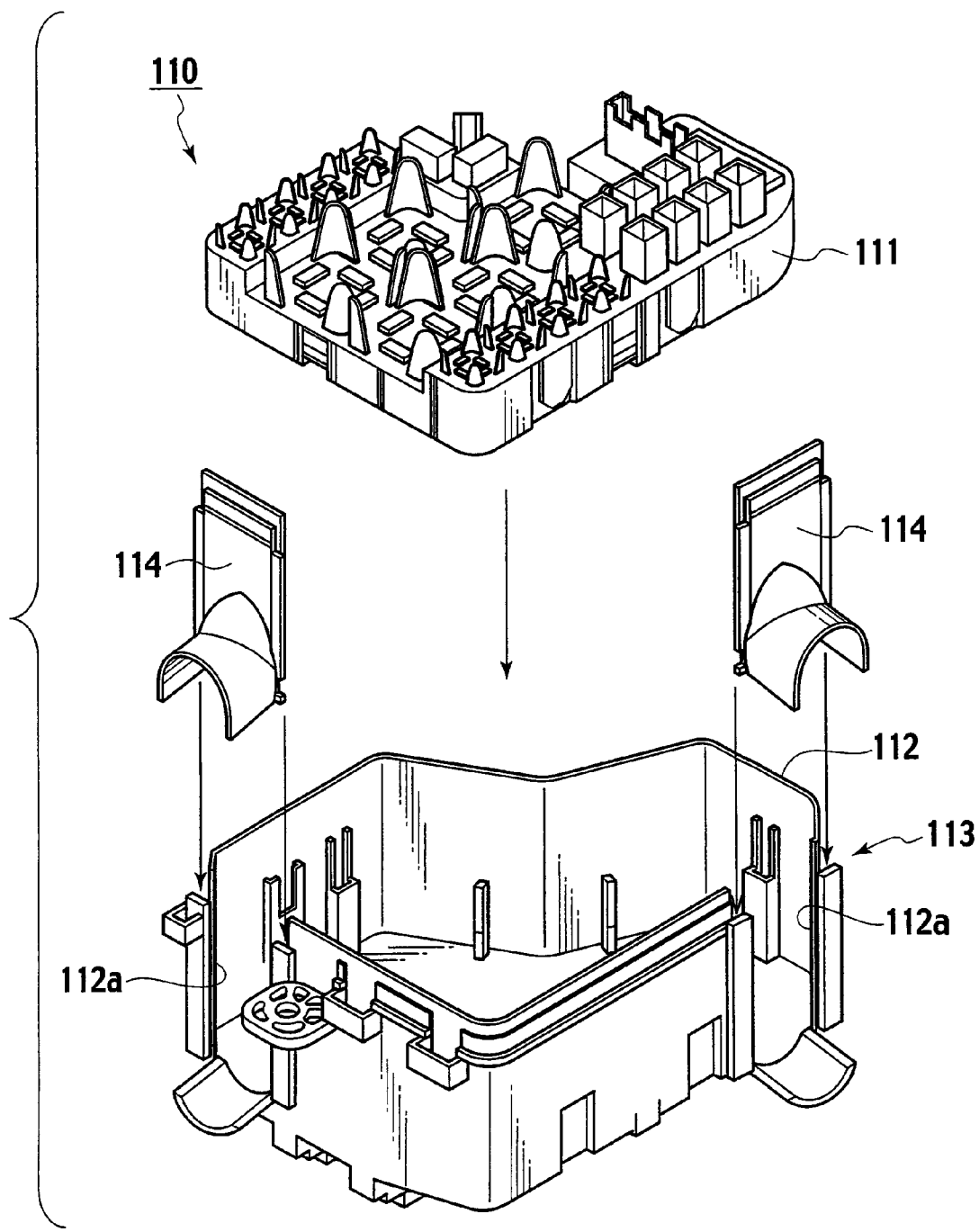
FIG. 2 is a perspective view showing a main part of another related electrical junction box.
Figure 3:
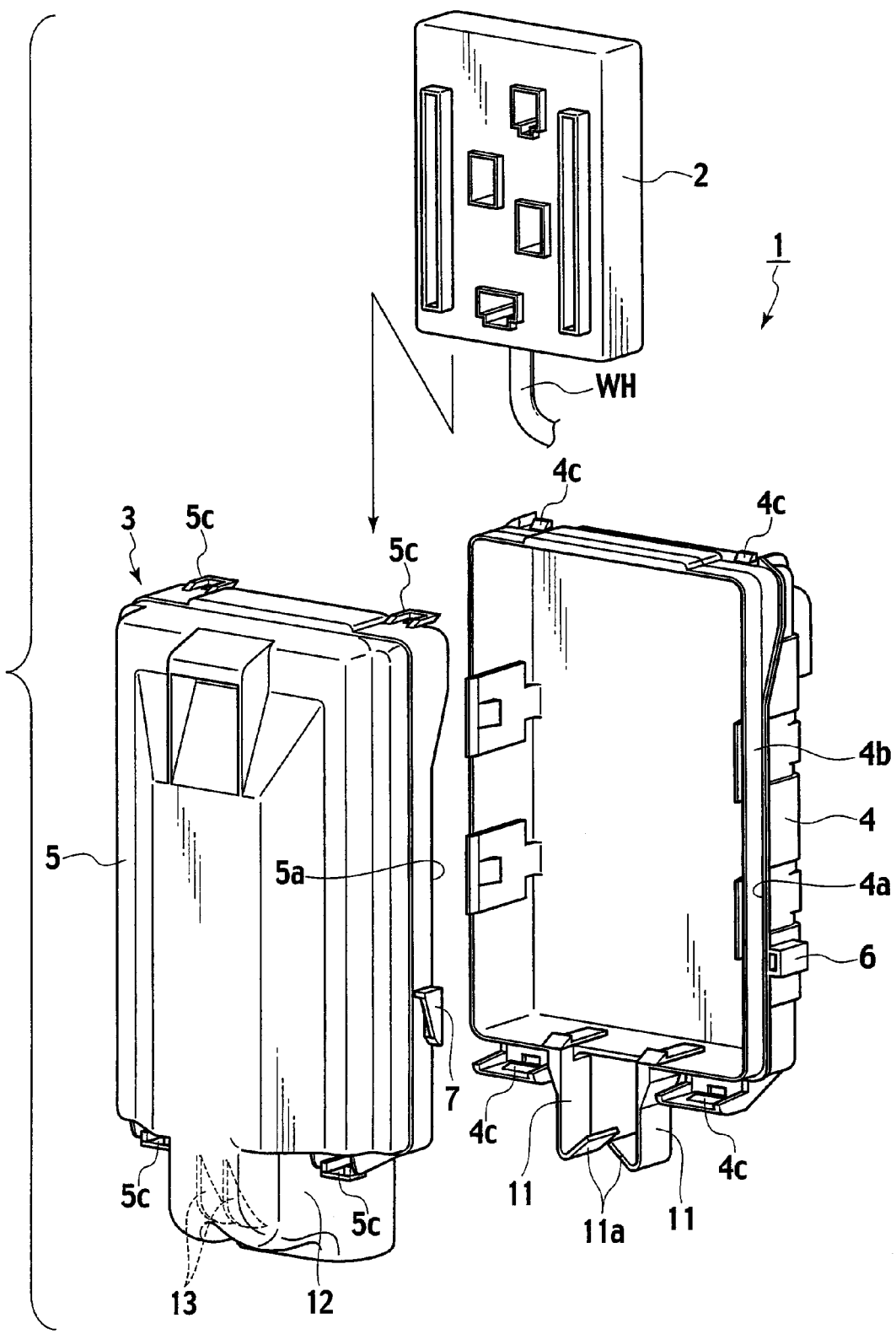
FIG. 3 is an exploded perspective view of an electrical junction box according to an embodiment of the present invention.
Figure 4:
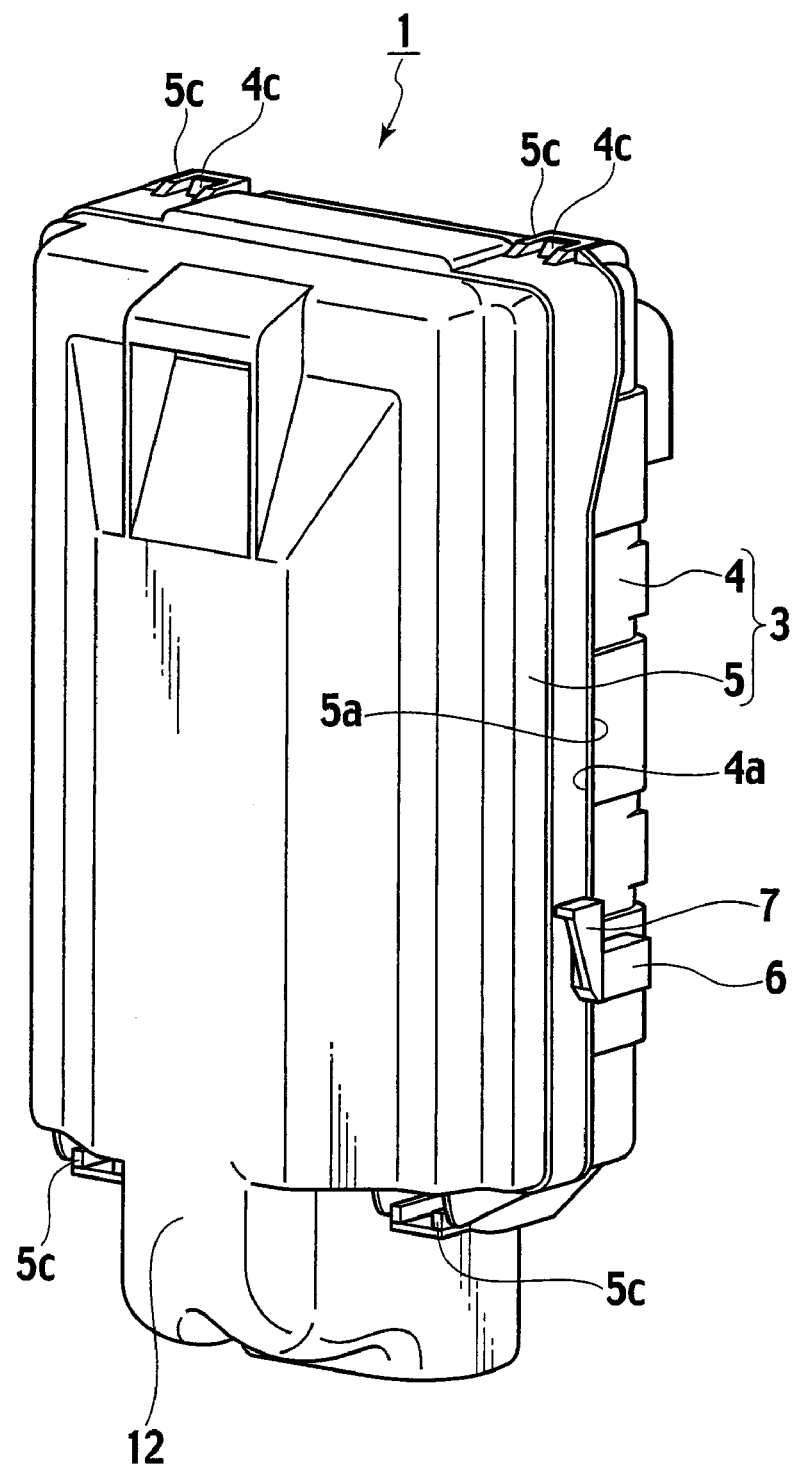
FIG. 4 is a perspective view of the electrical junction box according to the embodiment of the present invention.
Figure 5:
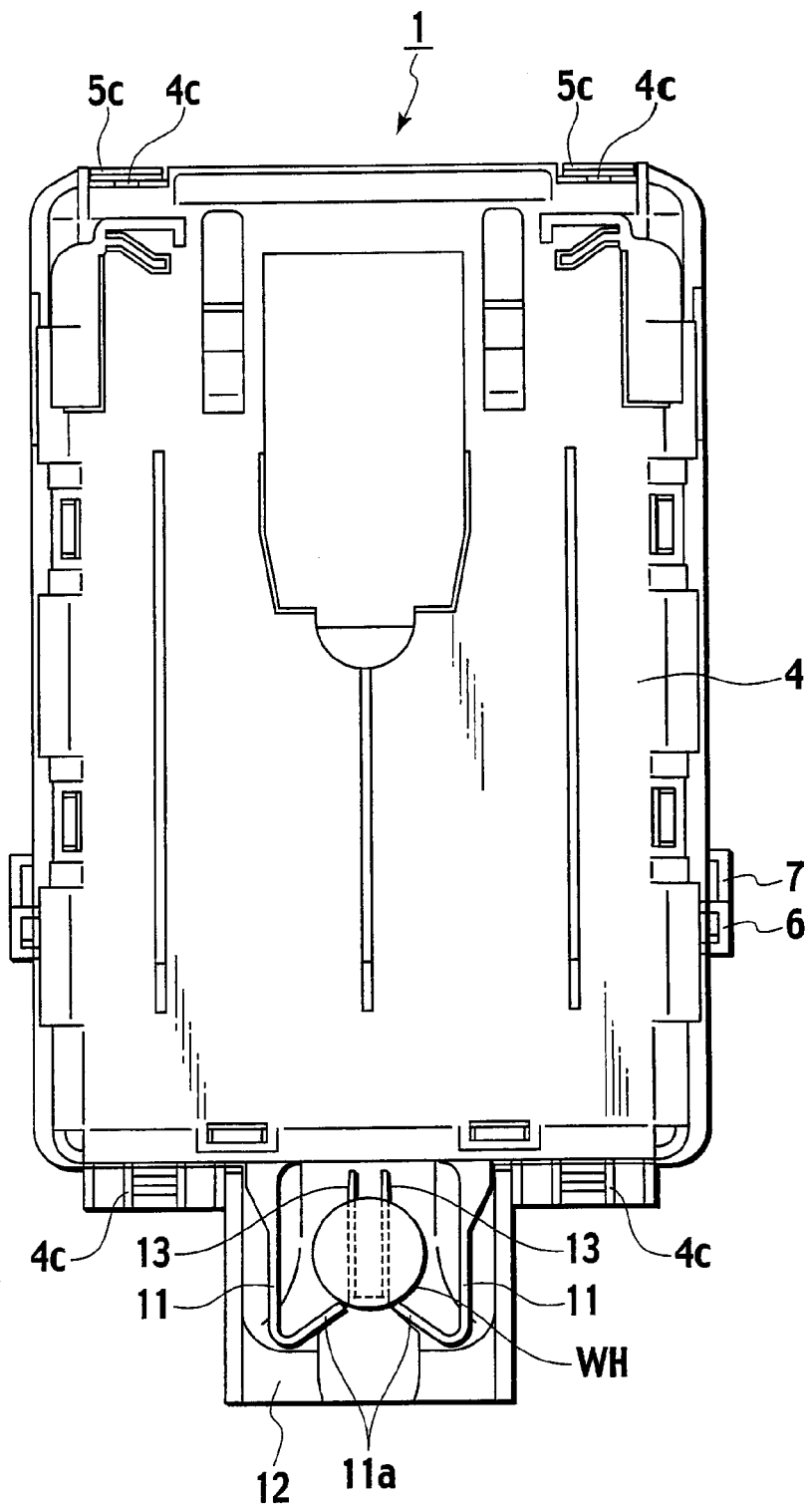
FIG. 5 is a back view of the electrical junction box according to the embodiment of the present invention.
Figure 6:
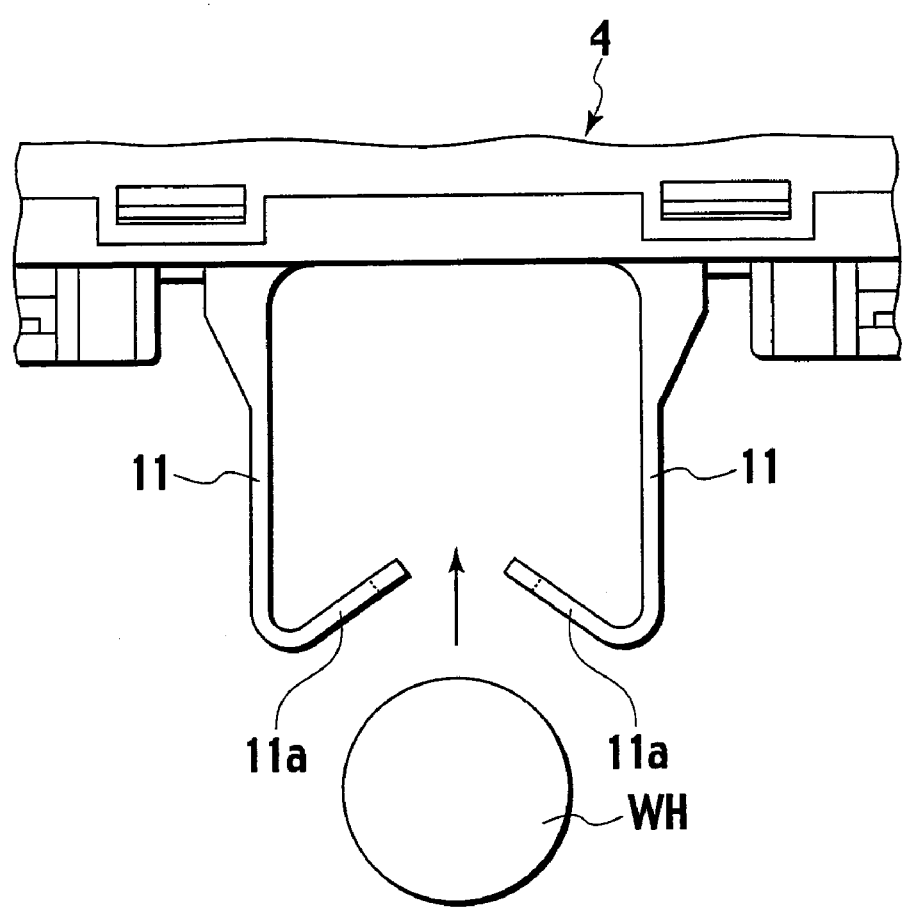
FIG. 6 is a front view of a harness temporary holding part of an under case member according to the embodiment of the present invention.
Figure 7:
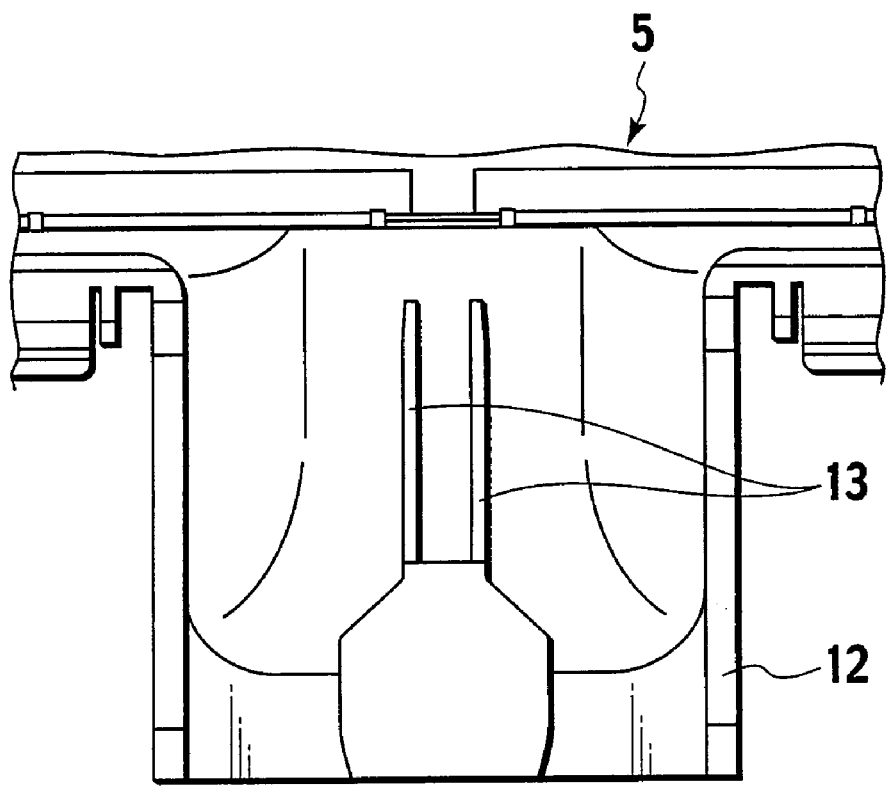
FIG. 7 is a view showing inside of a harness cover part of an upper case member according to the embodiment of the present invention.
Figure 8:
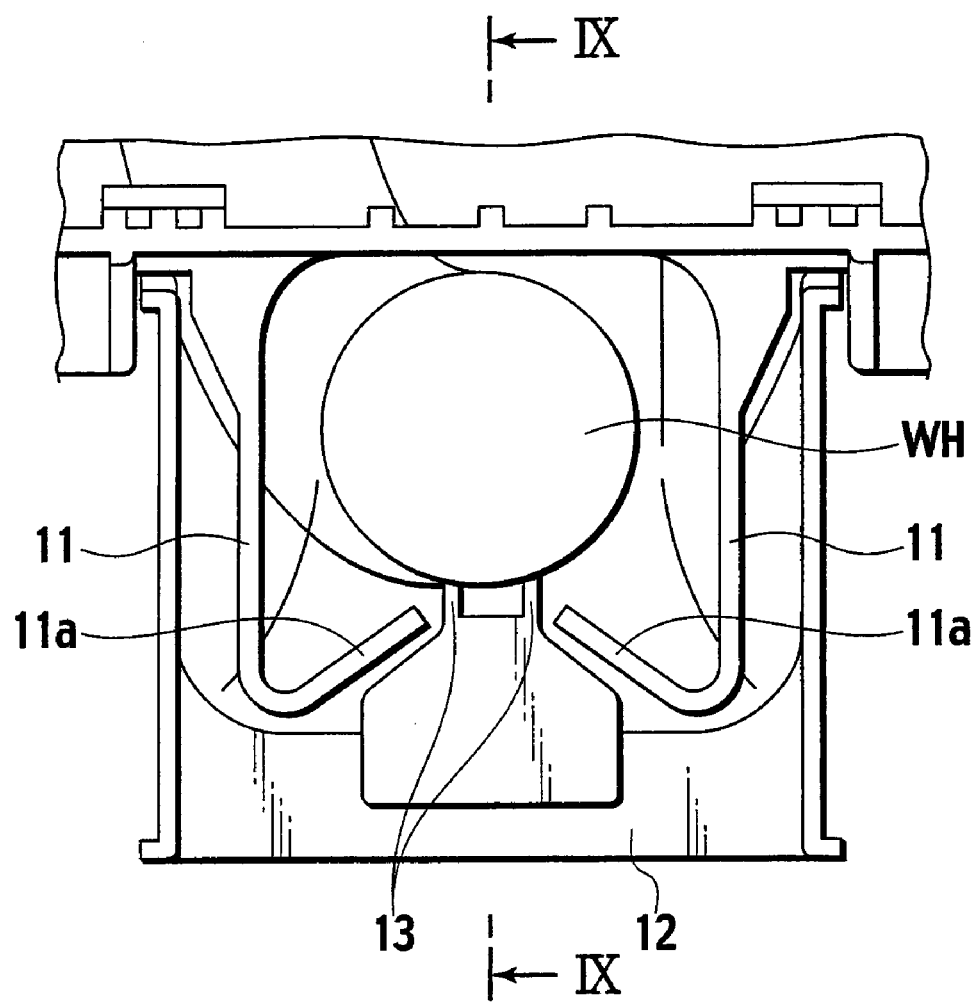
FIG. 8 is a back view showing a state where a wire harness is led out from a housing case according to the embodiment of the present invention.
Figure 9:
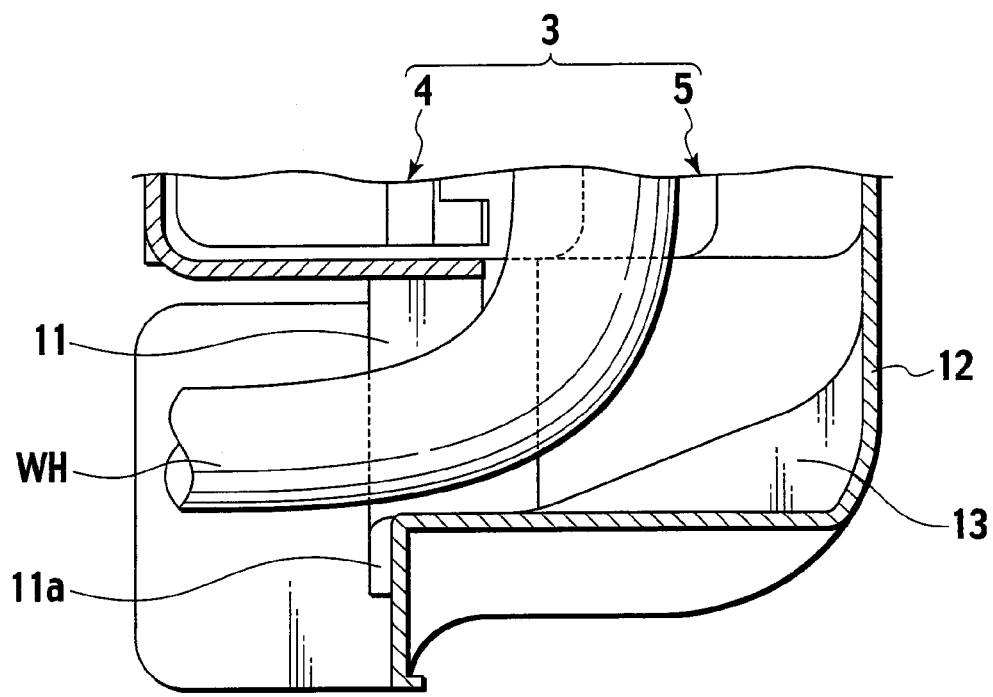
FIG. 9 is a cross-sectional view along the line IX-IX in FIG. 8.

With reference to the drawings, an embodiment of the present invention will be described below. In the following description of the drawings, the same or similar parts will be denoted by the same or similar reference numerals. FIGS. 3 to 9 show one embodiment of the present invention. FIG. 3 is an exploded perspective view of an electrical junction box. FIG. 4 is a perspective view of the electrical junction box. FIG. 5 is a back view of the electrical junction box. FIG. 6 is a front view of a harness temporary holding part of an under case member. FIG. 7 is a view showing inside of a harness cover part of an upper case member. FIG. 8 is a back view showing a state where a wire harness is led out from a housing case. FIG. 9 is a cross-sectional view along the line IX-IX in FIG. 8.

As shown in FIGS. 3 to 5, an electrical junction box 1 includes an electrical junction box main body 2 and a housing case 3 which houses the electrical junction box main body 2 therein and consists of an under case member 4 and an upper case member 5.

The electrical junction box main body 2 has fuses, relays and the like mounted therein and houses therein a branch circuit and the like connected through a bus bar. The electrical junction box main body 2 has unillustrated locking parts provided at proper positions on its peripheral surface so as to be housed in a positioned state in the housing case 3. One end of a wire harness WH is connected to the electrical junction box main body 2.

The under case member 4 and the upper case member 5 are assembled by making mating faces 4a and 5a thereof come into contact with each other. On a peripheral edge of the mating face 4a of the under case member 4, a waterproof peripheral wall 4b is provided upright. In a state where the under case member 4 and the upper case member 5 are assembled, the waterproof peripheral wall 4b of the under case member 4 is disposed so as to closely overlap an inner peripheral surface of the upper case member 5. Thus, intrusion of water is prevented.

At proper positions facing each other on the under case member 4 and the upper case member 5, locking parts 4c and 5c are provided, respectively, which can be locked to each other. When the mating faces 4a and 5a of the under case member 4 and the upper case member 5 come into contact with each other, the corresponding locking parts 4c and 5c are locked to each other. Thus, the under case member 4 and the upper case member 5 are assembled (see FIG. 4).

On left and right side faces of the under case member 4 and the upper case member 5, pairs of locking projections 6 and 7 are provided at corresponding positions, respectively. By locking the both pairs of locking projections 6 and 7 to a bracket (not shown) which is fixed to a vehicle body, the electrical junction box 1 is mounted in a predetermined position on the vehicle body.

On a lower end of the under case member 4, a pair of holding arms 11 are provided as a harness temporary holding part which leads out the wire harness WH, which is led out from the under case member 4, roughly in a desired lead-out direction. As shown in detail in FIG. 6, the pair of holding arms 11 are provided to hang down with a space therebetween and have a pair of drop preventing claws 11a on their leading ends, which are bent inward. When the wire harness WH is moved upward from below the pair of drop preventing claws 11a, the pair of holding arms 11 (particularly, the pair of drop preventing claws 11a) are elastically deformed to temporarily hold the wire harness WH therebetween. The wire harness WH is led out roughly in the desired lead-out direction by the pair of holding arms 11. In this embodiment, when the electrical junction box 1 is vertically mounted in a state where the mating faces 4a and 5a of the under case member 4 and the upper case member 5 are set in the vertical direction, the desired lead-out direction of the wire harness WH is a direction toward the under case member 4 and also a horizontal direction.

As shown in detail in FIG. 7, a harness cover part 12 is provided on a lower end of the upper case member 5. The harness cover part 12 is disposed so as to cover the pair of holding arms 11 in a state where the under case member 4 and the upper case member 5 are assembled. The harness cover part 12 restricts outward elastic deformation of the pair of holding arms 11. Moreover, the harness cover part 12 has two guide ribs 13 provided upright on its inner surface as a harness lead-out direction guiding part. As shown in FIGS. 8 and 9, in the assembled state of the under case member 4 and the upper case member 5, the two guide ribs 13 guide the wire harness WH in the desired lead-out direction, the wire harness WH being led out roughly in the desired lead-out direction by the pair of holding arms 11.

Next, an assembly operation for the electrical junction box 1 will be described. First, the electrical junction box main body 2 is temporarily housed in the under case member 4, and the wire harness WH having its one end connected to the electrical junction box main body 2 is temporarily held between the pair of holding arms 11. The wire harness WH is bent approximately at a right angle at a portion thereof temporarily held by the pair of holding arms 11. Thus, the wire harness WH is led out roughly in the desired lead-out direction. Next, the upper case member 5 is placed on the under case member 4, and the under case member 4 and the upper case member 5 are locked to each other by the locking parts 4c and 5c. Accordingly, the harness cover part 12 of the upper case member 5 is disposed at a position to cover the pair of holding arms 11, and the two guide ribs 13 guide the wire harness WH in the desired lead-out direction. Thus, assembly of the electrical junction box 1 is completed.

As described above, in the embodiment of the present invention, the pair of holding arms 11 are provided in the under case member 4. After the electrical junction box main body 2 is temporarily housed in the under case member 4, the wire harness WH is temporarily held between the pair of holding arms 11 in the under case member 4. Thereafter, the under case member 4 and the upper case member 5 are assembled to complete assembly of the electrical junction box 1. Accordingly, as a harness lead-out operation, the wire harness WH may be simply held between the pair of holding arms 11. Moreover, the wire harness WH is led out in the rough lead-out direction relative to the desired lead-out direction. Thus, good assemblability of the electrical junction box 1 is achieved and also the wire harness WH can be led out approximately in the desired lead-out direction without using accessories.

In this embodiment, the upper case member 5 has the two guide ribs 13 provided therein, which guide the wire harness WH in the desired lead-out direction, the wire harness being led out roughly in the desired lead-out direction by the pair of holding arms 11 in the under case member 4, in the assembled state of the under case member 4 and the upper case member 5. Consequently, the wire harness WH can be surely led out in the desired lead-out direction.

In this embodiment, the harness temporary holding part consists of the pair of holding arms 11 having the drop preventing claws 11a which are bent inward. The harness temporary holding part utilizes the elastic deformation of the pair of drop preventing claws 11a to temporarily hold the wire harness WH between the pair of holding arms 11. Therefore, the wire harness WH can be held only by being inserted between the pair of holding arms 11 while bending the arms.

In this embodiment, the upper case member 5 has the harness cover part 12 provided therein, which covers the pair of holding arms 11 in the assembled state of the under case member 4 and the upper case member 5. Therefore, the elastic deformation of the pair of holding arms 11 is inhibited by the harness cover part 12. Thus, it is possible to prevent a situation where the wire harness WH drops from the pair of holding arms 11. Moreover, it is possible to restrict the lead-out direction of the wire harness WH while protecting the wire harness WH so as not to allow external force to act thereon due to contact between the portion of the wire harness WH led out from the housing case 3 and other parts.

In this embodiment, the harness lead-out direction guiding part consists of the two guide ribs 13. Accordingly, the harness lead-out direction guiding part can be easily formed. The number of the guide ribs 13 is not limited to two but may be one or three or more.

In this embodiment, the pair of holding arms 11 are provided in the under case member 4, and the harness cover part 12 and the guide ribs 13 are provided in the upper case member 5. However, the pair of holding arms 11 may be provided in the upper case member 5, and the harness cover part 12 and the guide ribs 13 may be provided in the under case member 4.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An electrical junction box comprising:
    a housing case including an under case member and an upper case member; and
    an electrical junction box main body housed in the housing case;
        wherein a wire harness having one end connected to the electrical junction box main body is led out to outside of the housing case,
        one of the under and upper case members has a harness temporary holding part which temporarily holds the wire harness to be led out roughly in a desired lead-out direction in a state where the electrical junction box main body is temporarily housed in the one of the under and upper case members, the wire harness being led out from the one of the under and upper case members, and
        wherein the other one of the under and upper case members has a harness lead-out direction guiding part which guides the wire harness in the desired lead-out direction in an assembled state of the under and upper case members, the wire harness being led out roughly in the desired lead-out direction by the harness temporary holding part in the one of the under and upper case members.

2. The electrical junction box according to claim 1, wherein the harness temporary holding part includes a pair of holding arms having drop preventing claws which are bent inward, and the harness temporary holding part temporarily holds the wire harness by setting the wire harness in between the pair of holding arms with elastic deformation of the pair of holding arms.

3. The electrical junction box according to claim 2, wherein the other one of the under and the upper case members has a harness cover part which covers the pair of holding arms in the assembled state of the under and upper case members.

4. The electrical junction box according to claim 3, wherein the harness lead-out direction guiding part is guide ribs provided upright on an inner surface of the harness cover part.

5. The electrical junction box according to claim 1, wherein the other one of the under and the upper case members has a harness cover part which covers the temporary harness holding part in the assembled state of the under and upper case members.

6. The electrical junction box according to claim 1, wherein the harness lead-out direction guiding part is guide ribs provided upright on an inner surface of a harness cover part.

* * * * *